United States Patent [19]

Stumpel et al.

[11] 3,843,886

[45] Oct. 22, 1974

[54] POSITION SENSITIVE RADIATION DETECTOR

[75] Inventors: Jan Willam Marinus Hermanus Stumpel, Woking; Peter William Sanford, Bramley; Christopher Graham Rapley, Guilford, all of England

[73] Assignee: National Research Development Corporation, London, England

[22] Filed: May 17, 1973

[21] Appl. No.: 361,330

[30] Foreign Application Priority Data

May 18, 1972  Great Britain .................. 23463/72

[52] U.S. Cl. ................ 250/336, 250/370, 250/374
[51] Int. Cl. ............................................. G01t 1/24
[58] Field of Search ................... 250/336, 370, 374

[56] References Cited
UNITED STATES PATENTS

| 3,043,955 | 7/1962 | Friedland et al. ................ 250/370 |
| 3,207,902 | 9/1965 | Sandborg ......................... 250/370 |
| 3,529,161 | 9/1970 | Oosthoek et al. ................ 250/370 |

Primary Examiner—Archie R. Borchelt
Attorney, Agent, or Firm—Cushman, Darby & Cushman

[57] ABSTRACT

A position sensitive proportional converter for Soft X-rays is described comprising a circular resistive sheet having four symmetrically disposed electrodes. When an event produces a charge on the surface of the sheet, the signals generated at the electrodes by the charge are analysed so that the position and/or quantity of the charge can be calculated.

5 Claims, 5 Drawing Figures abc = CAPACITIVE PROBES FOR POSITION CALIBRATION.

COUNTER GAS (Ar-CH$_4$, Ne-CO$_2$)

POSITION SENSITIVE RADIATION DETECTOR

The present invention concerns a device for the measurement of ionising radiation and is particularly, but not exclusively, concerned with a position sensitive proportional counter for the measurement of soft X-rays. These occur, for example, in outer space and their measurement is often of great scientific interest. However the invention could also have applications in medicine in such fields as thyroid radiography and dental X-ray applications.

Previously position sensitive proportional counters used an array of resistive anode wires and readings were taken from the ends of these wires.

In accordance with the present invention there is provided a device for detecting ionising radiation comprising a plate-like conductor, a plurality of electrodes connected to the periphery of the conductor for detecting currents and/or voltages induced by charges deposited on the surface of the conductor, amplifiers coupled to the electrodes to amplify the signals so obtained and means for analysing the signals from the amplifiers to derive information concerning the position and/or quantity of the charge deposited on the conductor.

The embodiments of the present invention will now be described by way of example and with reference to the accompanying drawings in which FIG. 1 is a diagrammatic plan view of a measuring device constructed in accordance with the present invention;

FIG. 2($b$) is a diagrammatic illustration of a square sheet or cell;

Figure 1:
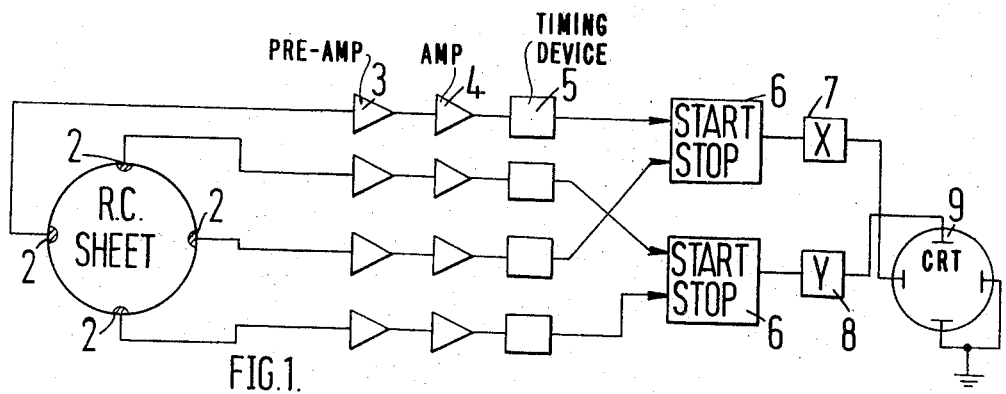

The device shown in FIG. 1 comprises a resistive sheet 1 which is circular and which has a uniform surface. The sheet 1 is made from lead oxide glass reduced at the surface to obtain $R = 1$ $M\Omega$ per square. Four electrodes 2 are connected to the periphery of the sheet 1 and are evenly spaced around the circumference of the sheet 1.

If a certain amount of charge is deposited on to some point of the sheet, this would cause the appearance of voltages and/or currents at the electrodes 2 which can be measured and from these measurements information can be derived about both the magnitude of the deposited charge and the position of the point where it was injected.

This can be seen by considering mathematically the four equations which govern the propagation of charge current and voltage across the sheet. The distribution of voltage on the sheet is given by the diffusion equation (equation 1), the surface charge density is given by equation 2, and the surface current density $\vec{J}$ is given by the equations (3) and (4).

$$\Delta V^2 = RC\ V/\delta\Gamma \tag{1}$$

$$\sigma = CV \tag{2}$$

$$\Delta_o \vec{J} = -C\ \delta V/\delta\Gamma \tag{3}$$

$$\vec{J} = -1/R\ DV \tag{4}$$

Where R, and C are resistive and capacitive constants for the plate 1, is the surface charge density, and is the surface current density.

The outputs of the electrodes are connected firstly to pre-amplifiers 3 in turn connected to main amplifiers 4 and timing devices, either doubly differentiating filters followed by cross-over detectors, shown as No. 5, or 'constant fraction' timers. These are in turn connected to a pair of time to amplitude converters 6. The output of one of the converters 6 is taken to a pulse stretcher 7 and the output of the other is taken to a pulse stretcher 8 and the stretched pulses used to drive the X and Y co-ordinate plates of a CRT 9.

Figure 2A:
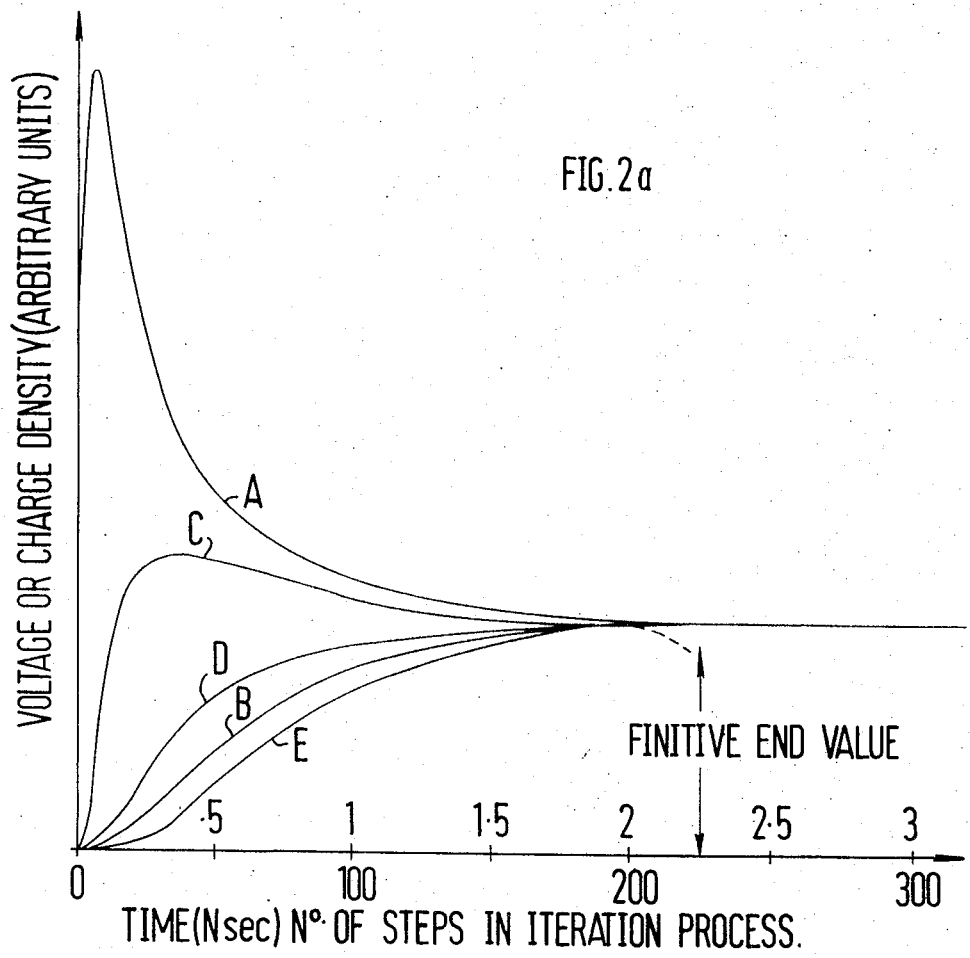
FIG. 2($a$) is a graph showing a computer solution for the operation of a device similar to that of FIG. 1.
Figure 2B:
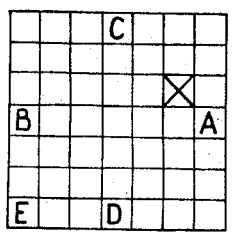

FIG. 2 gives a computer solution for the case of a square sheet which is shown at 2$b$ and which has been divided into a 7 × 7 matrix and which also has five electrodes A, B, C, D and E. The computed curves show the voltage pulses measured at these electrodes when a charge is injected at $T=o$ into the cell marked in FIG. 2$b$ with an X. In this case it was assumed that voltages are measured at the electrodes by means of amplifiers with infinite input impedance. This means that eventually the charge deposited at X will be distributed evenly across the whole sheet giving an equal and finite voltage on each of the electrodes. In practice the charge will leak away either via the input of the amplifiers or via separate resistors appropriately chosen to prevent pile up problems.

Figure 3:
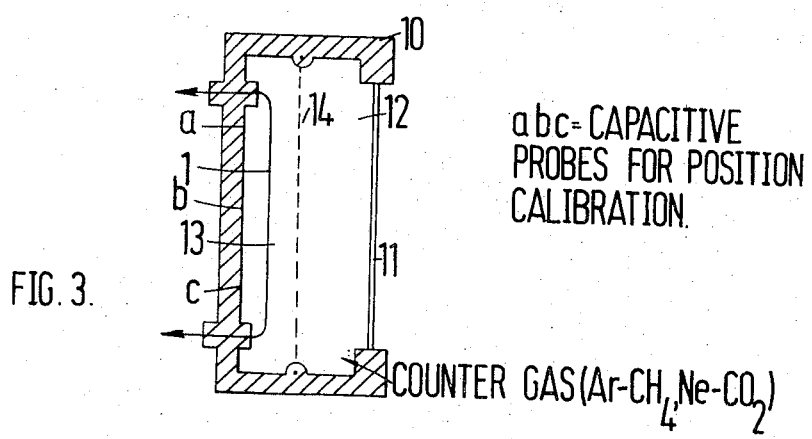
FIG. 3 is a section of part of a position sensitive detector for X-rays constructed in accordance with the present invention and FIG. 4 is a section of a detector constructed in accordance with the present invention for relatively hard X-rays.

In the embodiment shown in FIG. 3 the plate 1 is used in a position sensitive detector for X-rays. The position sensitive detector consists of an outer case 10 having a window 11 which is transparent to the radiation to be measured and which encloses a drift space indicated at 12 which has weak electric field. The drift space 12 is separated from a multiplication space 13 in which there is a strong electric field by a grid 14 which is transparent to electrons. The output from the electrodes of the plate 1 can be taken to an array of amplifiers etc., similar to that described with reference to FIG. 1. If this detector is to be used only for the detection of the very soft X-rays the drift space can be dispensed with.

Figure 4:
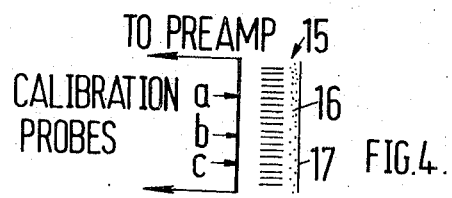

The embodiment shown in FIG. 4 can act as a camera for X-ray particles on relatively hard X-rays such as those employed in medicine. In this embodiment the plate 1 is mounted behind a channel multiplier plate 15 which is in turn mounted behind a fluorescent layer 16 which emits photons when bombarded by X-rays or particles, and this layer is mounted behind a window of gold foil 17 which is transparent to the radiation concerned but opaque to light. The device of FIG. 4 could also be used for the detection of soft X-rays provided by removing the gold foil layer 17 and the fluorescent layer 16. In such a case the device would have to be used in a vacuum.

Although the complete potentialities of the devices described hereinbefore have still to be established the following parameters seem to be entirely feasible.

Size: — 100 cm$^2$ (larger arrays are possible with some loss of resolution)

Energy range: — 0.25 to 30 kev for proportional counter. Limited by channel response when used as the readout for a channel plate.

Position resolution: — 100 microns for proportional counter and 10 microns for a channel multiplier.

Max. count rate:— $10_6^4$/sec for proportional counter 10 sec for a channel multiplier.

Min. count rate: — Background for a proportional counter i.e., $10^{-2}/cm^2/sec$.

Background of channel multiplier has yet to be determined.

We claim:

1. A device for detecting ionising radiation comprising a homogeneous plate-like conductor, a plurality of electrodes connected only to the periphery of the conductor for detecting electrical energy induced by charges deposited on the surface of the conductor, amplifiers coupled to the electrodes to amplify the signals so obtained and means for analysing the signals from the amplifiers to derive information concerning the position of the charge deposited on the conductor.

2. A device as claimed in claim 1, wherein the sheet is circular.

3. A device as claimed in claim 1 wherein the sheet is made of lead oxide glass.

4. A device as claimed in claim 1, and wherein said plurality of electrodes connected only to the periphery of the conductor comprise four electrodes disposed symmetrically around the sheet at the periphery thereof.

5. A device as claimed in claim 4, wherein each electrode is connected to individual amplifying means, each amplifying means in turn connected to a crossover detector, a pair of time-to-amplitude converters, the outputs of the crossover detectors associated with two diammetrically opposed electrodes being connected to one time-to-amplitude converter, and the cross-over detectors associated with the other pair of electrodes being connected to the other time-to-amplitude converter, and a pair of pulse stretchers, connected respectively to the output of each time-to-amplitude converter.

* * * * *